United States Patent [19]

Manfroni

[11] Patent Number: 4,698,984
[45] Date of Patent: Oct. 13, 1987

[54] BEATER DEVICE FOR ICE CREAM MAKING MACHINES

[75] Inventor: Ezio Manfroni, Bologna, Italy

[73] Assignee: Carpigiani Bruto Macchine Automatiche, Bologna, Italy

[21] Appl. No.: 2,208

[22] Filed: Jan. 12, 1987

[30] Foreign Application Priority Data

Jan. 15, 1986 [IT] Italy ............................... 15106/86[U]

[51] Int. Cl.$^4$ ............................................... A23G 9/12
[52] U.S. Cl. ..................................... 62/343; 366/149; 366/299
[58] Field of Search ................... 62/342, 343; 366/149, 366/297, 299

[56] References Cited

U.S. PATENT DOCUMENTS

| | | | |
|---|---|---|---|
| 249,938 | 11/1881 | Holmes | 366/297 X |
| 1,477,279 | 12/1923 | Peck | 62/343 X |
| 1,699,170 | 1/1929 | Turnbow | 62/343 |
| 2,085,542 | 6/1937 | Neitzel et al. | 62/343 |
| 2,361,035 | 10/1944 | Klaassen | 366/299 X |
| 2,523,853 | 9/1950 | Woodruff | 62/343 |
| 2,608,833 | 9/1952 | Woodruff | 62/343 X |
| 2,735,276 | 2/1956 | Thompson, Jr. | 62/342 X |
| 3,709,664 | 1/1973 | Krekeler et al. | 366/149 X |
| 4,084,407 | 4/1978 | Anhalt | 62/342 |

OTHER PUBLICATIONS

Pp. 51 and 55 from a catalogue from Taylor Freezer, date of publication unknown, but prior to the present invention.

Primary Examiner—William E. Tapolcai
Attorney, Agent, or Firm—Larson and Taylor

[57] ABSTRACT

An ice cream making machine provided with a rotating beater (5) and a stationary counter-beater (16). The stationary counter-beater is carried by a supporting shaft (15) connected at one end to a cross-plate (17) formed with notches (18) for engaging with pegs (14) secured to the closure door (10) of the freezing cylinder (1) of the ice cream machine. The opposite end of the shaft (15) is rotatably idly supported within a tubular hub (8) provided at the rear end of the rotating beater (5).

4 Claims, 2 Drawing Figures

BEATER DEVICE FOR ICE CREAM MAKING MACHINES

FIELD OF THE INVENTION

This invention relates to the ice cream making machines of the kind comprising a horizontally disposed freezing cylinder closed at one end by a suitable door provided with an ice cream dispensing assembly, which cylinder is cooled by the evaporator of a refrigerating unit and accomodates therein a rotatable beater actuated through a suitable transmission by a motor disposed outside of said freezing cylinder.

More particularly, this invention relates to a beater device for said machines, which comprises a rotating peripheral beater and a stationary central counter-beater intended to oppose the movement of the ice cream mass which is entrained in rotation in the freezing cylinder by the rotating beater.

BACKGROUND OF THE INVENTION

Ice cream making machines are known which use a rotating beater cooperating with a stationary counter-beater.

A machine which is provided with such a beater combination is, for example, the one described in U.S. Pat. No. 2,523,853 which comprises a rotating peripheral beater, cooperating with a stationary counter-beater carried by a central shaft which is steadily secured at one end thereof to the front door of the freezing cylinder, and is idly supported at the opposite end by the drive shaft of the rotating beater.

Another machine provided with a beater of this kind is the one manufactured by the Firm Taylor Freezer, in which the stationary counter-beater is in the form of a U-shaped member steadily secured to the ice cream dispensing door and provided with means for rotatably supporting one end portion of the rotating beater.

The drawbacks and disadvantages of the prior art devices comprising a stationary counter-beater cooperating with a rotating beater can be summarized as follows:

(a) Since the counter-beater is steadily fastened to the closure door for the freezing cylinder, the removal of said door (for inspection, periodic cleaning, or the like) is quite difficult and time-consuming, and in certain cases (such as in the machine of the mentioned U.S. Pat. No. 2,523,853) involves the complete dismantling of the entire beater assembly.

(b) By these known devices it is very difficult, if not impossible, to convert an existing machine without counter-beater into a machine provided with a counter-beater unless substantial modifications are made to the machine such as, inter alia, the replacement of the existing freezing cylinder door with a new modified door.

SUMMARY OF THE INVENTION

It is therefore the object of the present invention to provide a beater assembly for ice cream making machines of the kind set forth above, comprising a rotating beater and a stationary central counter-beater, which eliminates the disadvantages of the known devices and permits, inter alia, to easily and economically convert the existing machines having only a rotating beater into machines provided with a rotating beater and a stationary counter-beater, with no need to make substantial structural modifications to said machines.

According to a characteristic of this invention, said object is achieved by mounting the blades of the stationary counter-beater on a supporting shaft provided at one end thereof with a cross-plate having two diametrically opposed slots or notches adapted to engage, in an easily disengageable manner, with two pegs which are secured to the freezing cylinder closure door, so as to prevent that the counter-beater be entrained in rotation, however without providing any axial bond between plate and pegs, the other end of said shaft being idly supported within a bushing formed at the rear end of said rotating beater.

In this manner, the closure door may be easily removed.

Moreover, the device according to the invention permits the modification of the existing machines which are only provided with a rotating beater, into machines with beater and counter-beater assembly, by mounting thereon a stationary counter-beater according to the invention, with no need to modify the structure thereof.

The present invention has moreover for its object a counter-beater having a particular construction adapted to improve the quality of the ice cream produced thereby, and to expedite the withdrawal of ice cream from the machine.

BRIEF DESCRIPTION OF THE DRAWINGS

Further characteristics and advantages of the beater of the invention will be more apparent from the following description of a preferred embodidment thereof, shown by way of a non-limiting example in the accompanying drawings. wherein.

DESCRIPTION OF THE PREFERRED EMBODIMENT OF THE INVENTION

Figure 1:
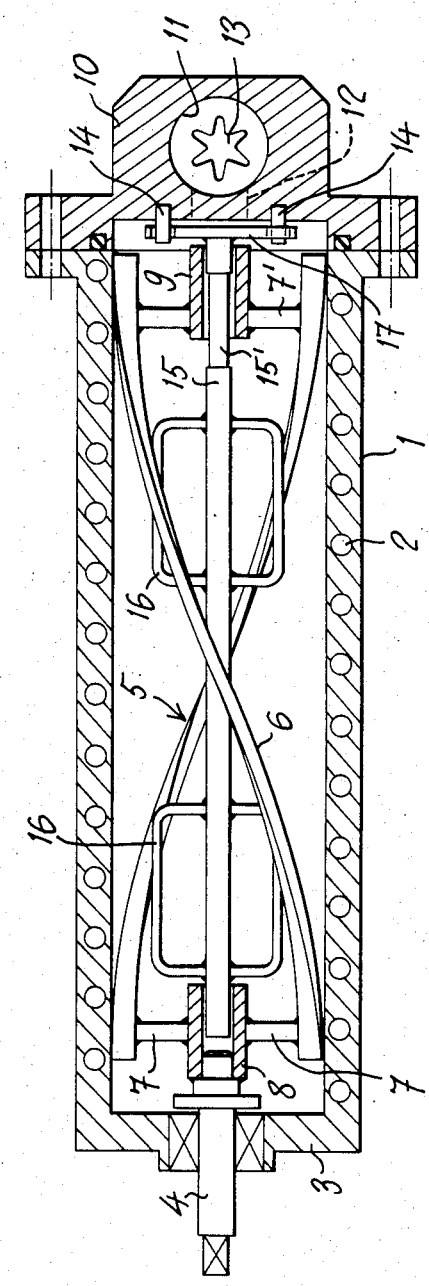
FIG. 1 is a longitudinal sectional view of the freezing cylinder of an ice cream making machine provided with the beater assembly according to this invention.

With reference to the drawings, and with particular reference to the FIG. 1 thereof, numeral 1 denotes the freezing cylinder of an ice cream making machine. Incorporated in this cylinder is the evaporator 2 of a refrigerating unit comprising, as usual in the art, a motor compressor and a condenser (not shown). the cylinder 1 is closed at the rear end thereof by a bottom plate 3 provided centrally with a port provided with suitable packing glands for the passage of the actuating shaft 4 of the beater 5. The actuating shaft 4 is driven, in usual way, by a motor through a suitable transmission (not shown). The beater shown in FIG. 1 of the drawings is of the kind comprising two scraping blades 6 of helical configuration, supported at one end thereof by a pair of spokes 7 which are secured to a tubular hub 8 keyed or otherwise secured at one end to to the shaft 4. The said scraping blades are supported at the other end thereof by a pair of spokes 7' which are secured to a tubular bushing 9. Of course, said beater may be of any other suitable kind, for example it may be of a kind with straight blades 6, or of the squirrel-cage type, or the like. The basic requirement is that said beater provides a free central space within the enclosure defined by the scraping blades 6, such as to accommodate a stationary counter-beater therein.

The front end of the freezing cylinder 1 is closed by a door 10 provided with any suitable dispensing assembly. In the example shown, the door 10 is formed with a cylindrical bore 11 which communicates with the interior of the freezing cylinder through a radial duct 12 and with the exterior through a ragged hole 13, said cylindrical bore 11 slidably accomodating an ice cream dispenser piston (not shown), all as known in the art.

Screwed or otherwise affixed to the inside surface of the door 10, are two cylindrical pegs 14.

The stationary counter-beater comprises a central shaft 15 fixedly supporting the beater members 16 which are comprised of a U-shaped rod-like elements secured to the shaft 15 in a diametrically-opposed arrangement. Obviously, said beater members 16 protrude radially to such an extent as to avoid interfering with the movement of the scraping blades 6 of the rotating beater.

The shaft 15 is rotatably supported, at one end thereof, in the front extension of the tubular hub 8, while at its opposite end it is welded or otherwise secured to the central portion of a cross-plate 17 which is formed near both ends thereof, at opposite sides, with two respective slots or notches 18 adapted to engage the pegs 14 so as to prevent the counter-beater 15, 16 from rotating, whilst supporting it firmly axially with respect to the the cylinder 1 in an easily engageable and disengageabale manner.

Figure 2:
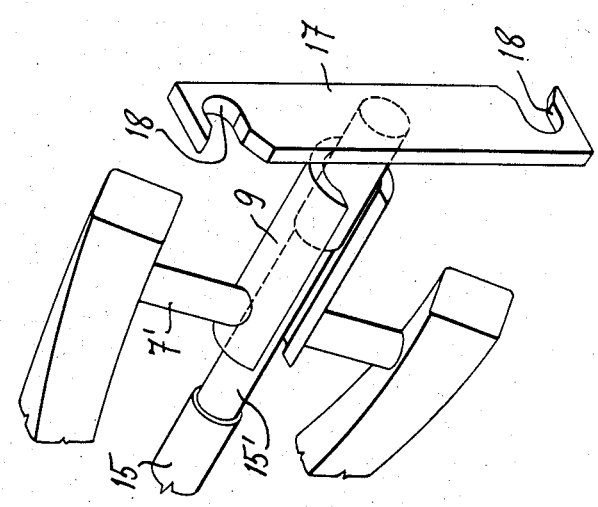
FIG. 2 is a detail perspective view of the front end of the beater according to the invention.

The bushing 9, as best shown in FIG. 2, is split longitudinally so as to permit the reduced portion 15' of the shaft 15 to be inserted laterally thereinto.

By this arrangement, the assembling and disassembling of the shaft 15 with its counter-beater assembly is very easy and can be effected without requiring the dismantling of the entire beater assembly.

It will be also apparent that the existing machines may also be provided with the stationary counter-beater by making only minor modifications thereto, and by affixing the two pegs to the existing doors.

By virtue of this stationary counter-beater, the yield and performance of the existing machines will be improved considerably.

Therefore, this invention is not limited to the embodiment herein shown and described, but it comprises all changes and modifications falling within the scope of the invention, as claimed hereinafter.

I claim:

1. An ice cream making machine of the kind comprising a refrigerated freezing cylinder which is closed at its rear end by a bottom plate, and is closed at its front end by a closure door which is provided with means for withdrawing the ice cream, a rotating beater housed inside of said freezing cylinder, and a stationary counter-beater cooperating with said rotating beater, the said stationary counter-beater beng mounted on a supporting shaft which is connected at one end with a cross-plate formed with means for engaging, in an easily disengageable manner, with pegs secured to the closure door of the freezing cylinder of the ice cream making machine, the other end of said shaft being rotatably idly supported within a tubular hub provided at the rear end of the said rotating beater.

2. An ice cream making machine according to claim 1, in which the said rotating beater comprises at least two scraping blades which are secured at the ends thereof to a pair of spokes carried by two tubular hubs, one of said tubular hubs being secured at one end to a drive shaft for the said rotating beater, while the other end thereof is formed with a tubular recess for accomodating the rear end of the shaft of the said stationary counter-beater, the other tubular hub being longitudinally split such as to permit the other end of the shaft of the said stationary counter-beater to be inserted laterally thereinto.

3. An ice cream making machine according to claim 1, in which the said cross-plate secured to the front end of the shaft of the stationary counter-beater is formed with two diametrically opposed slots or notches adapated for engaging and self-centering, in an easily disengageable manner, with said pegs which are secured to the closure door of the freezing cylinder of the ice cream making machine.

4. An ice cream making machine according to claim 1, in which the said beater blades of the stationary counter-beater are formed by U-shaped rod-like elements.

* * * * *